US006889277B2

(12) United States Patent
Musumeci (10) Patent No.: US 6,889,277 B2
(45) Date of Patent: May 3, 2005

(54) SYSTEM AND METHOD FOR DYNAMICALLY TUNING INTERRUPT COALESCING PARAMETERS

(75) Inventor: Gian-Paolo D. Musumeci, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 450 days.

(21) Appl. No.: 10/125,196

(22) Filed: Apr. 18, 2002

(65) Prior Publication Data

US 2003/0200368 A1 Oct. 23, 2003

(51) Int. Cl.[7] .............................................. G06F 13/24
(52) U.S. Cl. .................... 710/260; 710/104; 710/125; 710/118; 710/262
(58) Field of Search ................................ 710/104, 260, 710/125, 118, 262

(56) References Cited

U.S. PATENT DOCUMENTS

| | | | | |
|---|---|---|---|---|
| 5,613,129 A | * | 3/1997 | Walsh | 710/267 |
| 5,881,296 A | * | 3/1999 | Williams et al. | 710/263 |
| 6,065,089 A | * | 5/2000 | Hickerson et al. | 710/266 |
| 6,189,066 B1 | * | 2/2001 | Lowe et al. | 710/260 |
| 6,189,067 B1 | * | 2/2001 | Lowe et al. | 710/260 |
| 6,192,440 B1 | * | 2/2001 | Lowe et al. | 710/260 |
| 6,195,725 B1 | * | 2/2001 | Luhmann | 710/266 |
| 6,243,785 B1 | * | 6/2001 | Lowe et al. | 710/260 |
| 6,266,732 B1 | * | 7/2001 | Chen et al. | 710/263 |
| 6,351,785 B1 | * | 2/2002 | Chen et al. | 710/263 |
| 6,430,628 B1 | * | 8/2002 | Connor | 710/5 |
| 6,529,986 B1 | * | 3/2003 | Chen et al. | 710/263 |
| 6,574,694 B1 | * | 6/2003 | Chen et al. | 710/263 |
| 6,615,305 B1 | * | 9/2003 | Olesen et al. | 710/262 |
| 6,681,275 B2 | * | 1/2004 | Connor et al. | 710/58 |
| 6,754,738 B2 | * | 6/2004 | Brice et al. | 710/48 |
| 6,779,054 B2 | * | 8/2004 | Campbell et al. | 710/48 |
| 2003/0056041 A1 | * | 3/2003 | Connor et al. | 710/58 |
| 2003/0065853 A1 | * | 4/2003 | Lary et al. | 710/260 |
| 2003/0079067 A1 | * | 4/2003 | Schmidt | 710/48 |
| 2003/0084213 A1 | * | 5/2003 | Brice et al. | 710/48 |
| 2003/0200369 A1 | * | 10/2003 | Musumeci | 710/260 |

OTHER PUBLICATIONS

Bilas, Angelos, et al., "The Effects of Communication Parameters on End Performance of Shared Virtual Memory Clusters," 1997, ACM Press, Proceedings of the 1997 ACM/IEEE Conference on Supercomputing, p. 1–35.*

* cited by examiner

Primary Examiner—Mark H. Rinehart
Assistant Examiner—Donna K. Mason
(74) Attorney, Agent, or Firm—Park, Vaughan & Fleming LLP (57) ABSTRACT

A system and method for dynamically tuning the interrupt coalescing behavior of a communication interface to suit the workload of the interface. An interrupt handler adjusts dynamic Packet and/or Latency values of the interface to control how many packets the interface may accumulate, or how much time the interface may wait after receiving a first packet, before it can signal a corresponding interrupt to a host processor and forward the accumulated packet(s). The interrupt handler maintains a Trend parameter reflecting a comparison between recent sets of packets received from the interface and the interface's Packet parameter. The Packet value is decreased or increased as packet traffic ebbs or flows. When the Packet value is incremented from a minimum value, a Fallback mechanism may be activated to ensure a relatively rapid return to the minimum value if an insufficient amount of traffic is received to warrant a non-minimum Packet value.

51 Claims, 6 Drawing Sheets

FIG. 4B

SYSTEM AND METHOD FOR DYNAMICALLY TUNING INTERRUPT COALESCING PARAMETERS

BACKGROUND

This invention relates to the field of computer systems. More particularly, a system and methods are provided for dynamically adjusting parameters of a communication interface, in response to a dynamic measurement of the interface workload, to modify the manner in which the communication interface coalesces interrupts associated with the forwarding of communications to a host processor.

When a communication interface (e.g., a network interface circuit, or NIC) receives a packet, frame or other communication from a communication link, it is usually configured to notify a host processor via an interrupt. In early network interfaces, a separate interrupt may have been issued for each packet the interface received from the network and forwarded to the host. As long as data rates were low, packets would arrive relatively infrequently, and a host processor would not be overwhelmed.

However, at today's data rates of 1 gigabit per second and higher, if a separate interrupt were issued by a network interface for every packet it received and passed to a host processor, it would signal more than 80,000 interrupts per second. Even a modem, high-performance, processor, if besieged with so many interrupts, would likely be incapable of processing them and switching in and out of an interrupt-processing mode, while still handling normal processing tasks.

One method of decreasing the number of interrupts issued by a communication interface to a host processor is called interrupt blanking or interrupt coalescing. With interrupt blanking, a communication interface may accumulate multiple packets before issuing an interrupt to a host processor. Illustratively, when the communication interface receives a first packet, it initiates a packet counter and a latency timer. When either a predetermined number of packets is accumulated or a predetermined period of time elapses, all of the accumulated packets are sent to the host and one interrupt is signaled.

Interrupt blanking or coalescing has typically been implemented solely within the communication interface hardware. The parameters that determine when an interrupt may be issued (i.e., maximum packet count, maximum latency) were static parameters programmed into the communication interface before or during its initialization. The parameters cannot be changed without resetting the interface and disrupting the communication flow through the interface.

Thus, the parameters for controlling interrupt blanking must be configured before the pattern of traffic to be handled is known. At one extreme, the traffic may be relatively heavy; at the other, the traffic may be relatively light. A heavy traffic pattern is typical of the transfer of a large amount of data, and involves the receipt of many separate packets relatively close in time. A light traffic pattern, involving the receipt of relatively few packets, spread out over time, may be indicative of a request-response communication flow between a client and a server, or other entities.

If a communication interface was optimized for one type of traffic, it would necessarily handle the other type inefficiently. Thus, configuring the interrupt blanking parameters for a high packet count and high latency would allow for efficient handling of a large amount of data, but would provide poor performance for a request-response flow. A low packet count and low latency would entail the opposite. Thus, the parameters have typically been optimized for either heavy or light traffic, thereby handling the other type very ineffectively, or have been set to median values, in which case both types are handled equally inefficiently.

Because interrupt blanking parameters have been static, as the traffic received by a communication interface varied from what it was optimized for, performance would vary commensurately. The parameters could not be dynamically configured to meet the changing traffic pattern.

SUMMARY

Therefore, in one embodiment of the invention, a system and methods are provided for dynamically modifying the interrupt blanking (or coalescing) behavior of a communication interface, in response to the changing workload or traffic pattern received at the interface.

In an embodiment of the invention, an interrupt handler dynamically adjusts IMFC (Instantaneous Maximum Frame Count) and/or IML (Instantaneous Maximum Latency) values on the communication interface. IMFC and IML control, respectively, how many frames the interface may accumulate, or how much time the interface may wait after receiving a first frame, before signaling a corresponding interrupt and forwarding the accumulated packet(s). The interrupt handler maintains a Trend parameter reflecting a comparison between recent sets of frames received from the interface and the interface's IMFC parameter at the time of the interrupts. The IMFC value is decreased or increased as a flow of frames ebbs or flows.

In one embodiment of the invention, when IMFC is incremented from a minimum value, a fallback mechanism is activated to ensure a relatively rapid return to the minimum value if an insufficient amount of traffic is received to warrant the higher IMFC value. While the fallback mechanism is active, IML may be set at lower than normal values. When the fallback mechanism expires, IML may be reset to a default or normal value.

During each interrupt serviced by the interrupt handler, one or both IMFC and IML may be written to the communication interface to overwrite previous values and control the interrupt coalescing behavior of the interface.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

In one embodiment of the invention, a system and method are provided for dynamically adjusting operating parameters of a communication interface (e.g., a network interface circuit or NIC), in response to a dynamic measure of communication traffic through the interface, to alter the frequency with which interrupts are issued by the interface to a host processor. In this embodiment, the adjustable parameters are used to determine how many communications (e.g., frames, packets) the interface may accumulate, or how long a period of time to wait after receipt of a first interrupt, before another interrupt may be issued.

The parameters that are adjusted in an embodiment of the invention may be collectively termed "interrupt coalescing parameters." In embodiments of the invention described herein, the individual parameters may be termed IMFC (Instantaneous Maximum Frame Count) for the number of communications the interface may accumulate before issuing an interrupt, and IML (Instantaneous Maximum Latency) for the amount of time the interface may wait, after receiving a communication, before signaling an interrupt.

In an embodiment of the invention, an interrupt handler called by a host processor (e.g., in response to an interrupt from the communication interface) is configured to examine a workload or pattern of communications received through the interface and dynamically modify the interface parameters to suit that workload. For example, if the number of communications is consistently high, the interrupt handler may increase the interface's IMFC parameter; if the number of communications is decreasing or steadily low, the interrupt handler may decrease IMFC.

Figure 1:
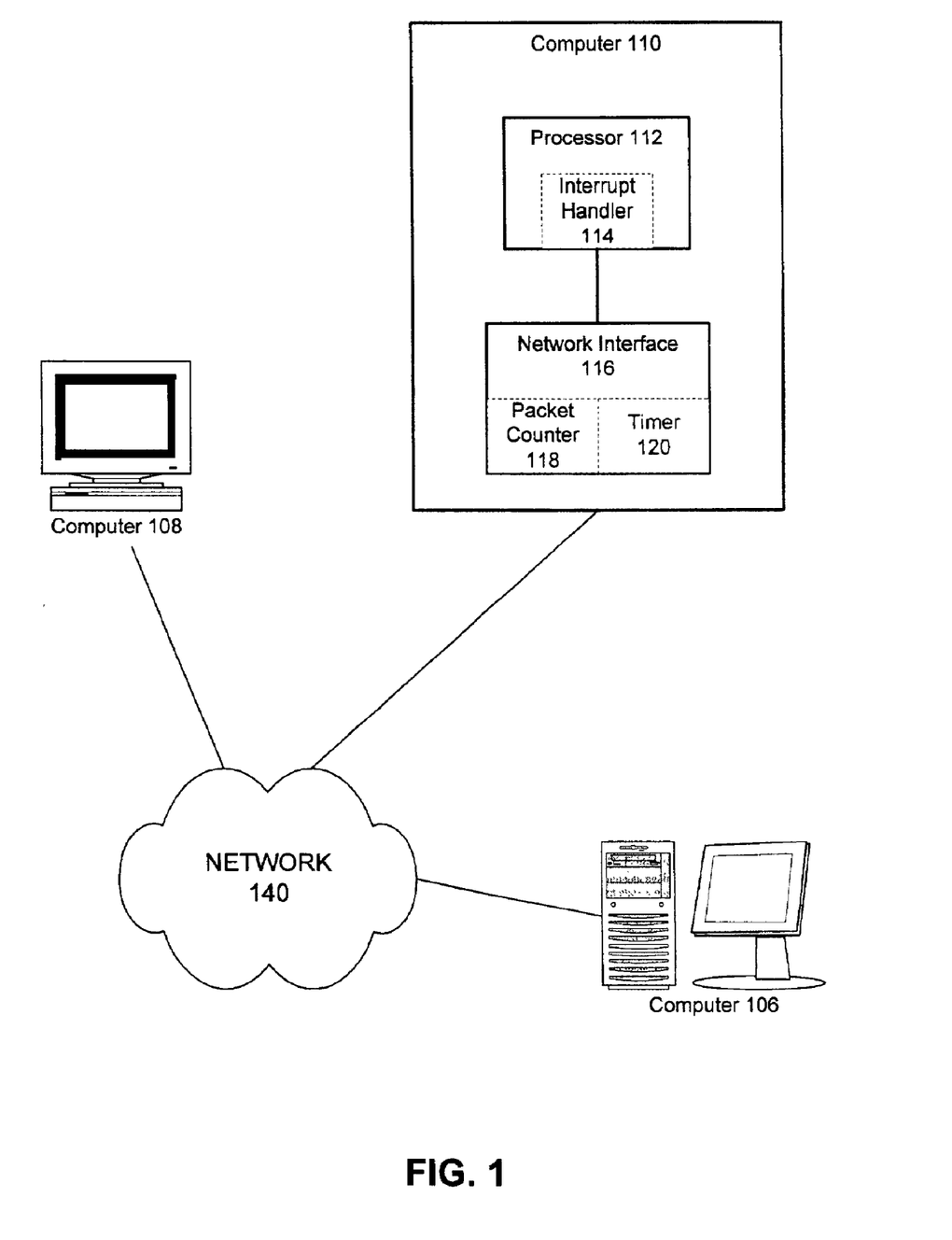
FIG. 1 is a block diagram depicting a computing environment in which an embodiment of the present invention may be implemented.

FIG. 1 depicts a computing environment in which an illustrative embodiment of the invention may be implemented. In FIG. 1, computers 106, 108, 110 are interconnected via network 140, which may comprise the Internet. Computer 110 comprises processor 112 and network interface 116. Network interface 116 includes, for purposes of an embodiment of the invention, packet counter 118 and timer 120.

Illustratively, packet counter 118 comprises a hardware register or operating parameter for storing an IMFC value computed for network interface 116 by interrupt handler 114 (when executed by processor 112). Similarly, timer 120 comprises a register or parameter for storing an IML value computed by the interrupt handler.

In an alternative embodiment of the invention, network interface 114 may be any communication interface that employs parameters that can be adjusted to affect the generation of interrupts. Another alternative embodiment may be implemented in a computer comprising multiple communication interfaces handling the same or different types of traffic. Thus, an embodiment of the invention may be implemented for wired and/or wireless communications formatted according to any communication protocol(s), such as Ethernet, TCP/IP, ATM (Asynchronous Transfer Mode), WAP (Wireless Access Protocol) and so on.

In an embodiment of the invention, an interrupt handler (e.g., interrupt handler 114 of FIG. 1) determines appropriate settings for the IMFC and/or IML parameters of a communication interface as frequently as every interrupt it services. In other embodiments, some other frequency may be applied (e.g., every other interrupt). The parameters are set according to trends it detects in traffic received from the interface. If multiple communication interfaces are employed in one computer system, whether they are serviced by one interrupt handler or by different handlers, the interrupt coalescing parameters of each interface may be set independently of the other(s).

To limit or restrict the range of values that can be assigned to IMFC and/or IML, one or more operating parameters may be exposed to a user for suitable configuration. For example, in one embodiment of the invention, a user may set a "maximum_packets" parameter to serve as an upper bound on IMFC. A user may also be able to set a "maximum_latency" parameter to serve as an upper bound on IML. In one implementation of this embodiment, a default value for maximum_packets is twenty-four, while a default value for maximum_latency is 13.5 microseconds.

Also, lower bounds, herein called "minimum_packets" and "minimum_latency," may be placed on IMFC and IML, respectively. Illustrative values for minimum_packets and minimum_latency are 1 packet and 4.5 microseconds, respectively. In this embodiment of the invention, latency values are restricted to multiples of 4.5 microseconds. This type of restriction may be expressed as another parameter, "incremental_latency." In other embodiments (e.g., for a different type of processor or computer system), a different incremental latency may be applied, and/or a user may not be able to set a lower bound on IMFC or IML.

In one embodiment of the invention, a maximum Fallback Latency Sensitivity (maximum_FLS) parameter is exposed to a user. In this embodiment, the FLS parameter is expressed as a number of interrupts. Operation of an FLS mechanism or process, as explained in detail below, helps alleviate, or suppress, an inefficient pattern of adjustments to interrupt coalescing parameters.

Illustratively, when a communication interface is initialized, its IMFC is set to a user-supplied value for minimum_packets, and IML is set to a user-supplied value for maximum_latency. Alternatively, either or both IMFC and IML may be set to some default or intermediate values (e.g., between minimum_packets and maximum_packets, and between minimum_latency and maximum_latency). During operation of a method of the invention, IMFC and IML are dynamically adjusted according to the type or pattern of traffic forwarded to the host from the communication interface.

While determining an appropriate new value for an interrupt coalescing parameter, the interrupt handler makes use of a "Trend" value or parameter as a dynamic representation of traffic received from the communication interface. More particularly, Trend indicates whether one or more recent interrupts have been issued with full complements of packets (i.e., a number of packets at least equal to IMFC). In other words, Trend indicates how the number of packets received with one or more preceding interrupts compares to the values of IMFC at the time of the interrupts. In one implementation, the value of Trend is an integer, and therefore may be negative, positive or zero.

In one embodiment of the invention, as high numbers of packets, frames, cells or other communications are received, the interrupt handler receives a full load of packets with each interrupt it services. This means that the communication interface's IMFC parameter is continually met, and may be a sign that even more packets could be forwarded with each interrupt. The value of the Trend parameter will increase, and may become more and more positive each time the interrupt handler receives a full load of packets. Conversely, each time the number of packets received with an interrupt is less than IMFC, Trend is decreased, and may become more and more negative, to indicate a negative correlation between IMFC and the number of packets being received.

If the traffic "trend" reverses polarity, Trend may be set to zero. For example, if Trend is positive, and then the interrupt handler receives less than a full set of packets (i.e., less than IMFC) with an interrupt, Trend may be set to zero. Or, if Trend is negative, and the interrupt handler receives a full set of packets, this also may cause Trend to be set to zero. Resetting Trend to zero may prepare it to change polarity from where it was, to quickly reflect a change in workload (e.g., from bulk data transfer to request-response, or vice versa).

As one skilled in the art will appreciate, an interrupt handler may be able to determine the cause of an interrupt received from a communication interface by comparing the number of packets received with an interrupt to the interface's IMFC. If the number of packets is less than IMFC, then it is likely that the interrupt was signaled because the interface's IML parameter expired. Conversely, if the number of packets received is at least equal to IMFC, then it is likely that the interrupt was issued because the IMFC parameter was reached.

In one embodiment of the invention, each time an interrupt associated with a packet transfer is received, and the interrupt handler is called, the interrupt handler compares the number of packets received with the interrupt to the current IMFC setting. Then the current Trend is examined. Unless the number of received packets contradicts the trend, in which case Trend is zeroed and the interrupt handler can finish any other interrupt-related tasks (e.g., processing the packets), the IMFC is combined with the current Trend to produce a new IMFC value. Then, Trend may be incremented or decremented to generate a new Trend value. Finally, the IMFC parameter or register of the communication interface is updated to (e.g., overwritten by) the new IMFC value and the interrupt handler can continue its work. The interface's IML parameter may also be updated.

Between its servicing of interrupts, various values used by the interrupt handler to adjust an interrupt coalescing parameter (e.g., IMFC, IML, Trend, minimum_latency, maximum_packets, incremental_latency, various counters) may be stored as part of a device driver's information structure. In particular, for each communication interface, a separate set of parameters may be maintained by its driver.

Figure 2:
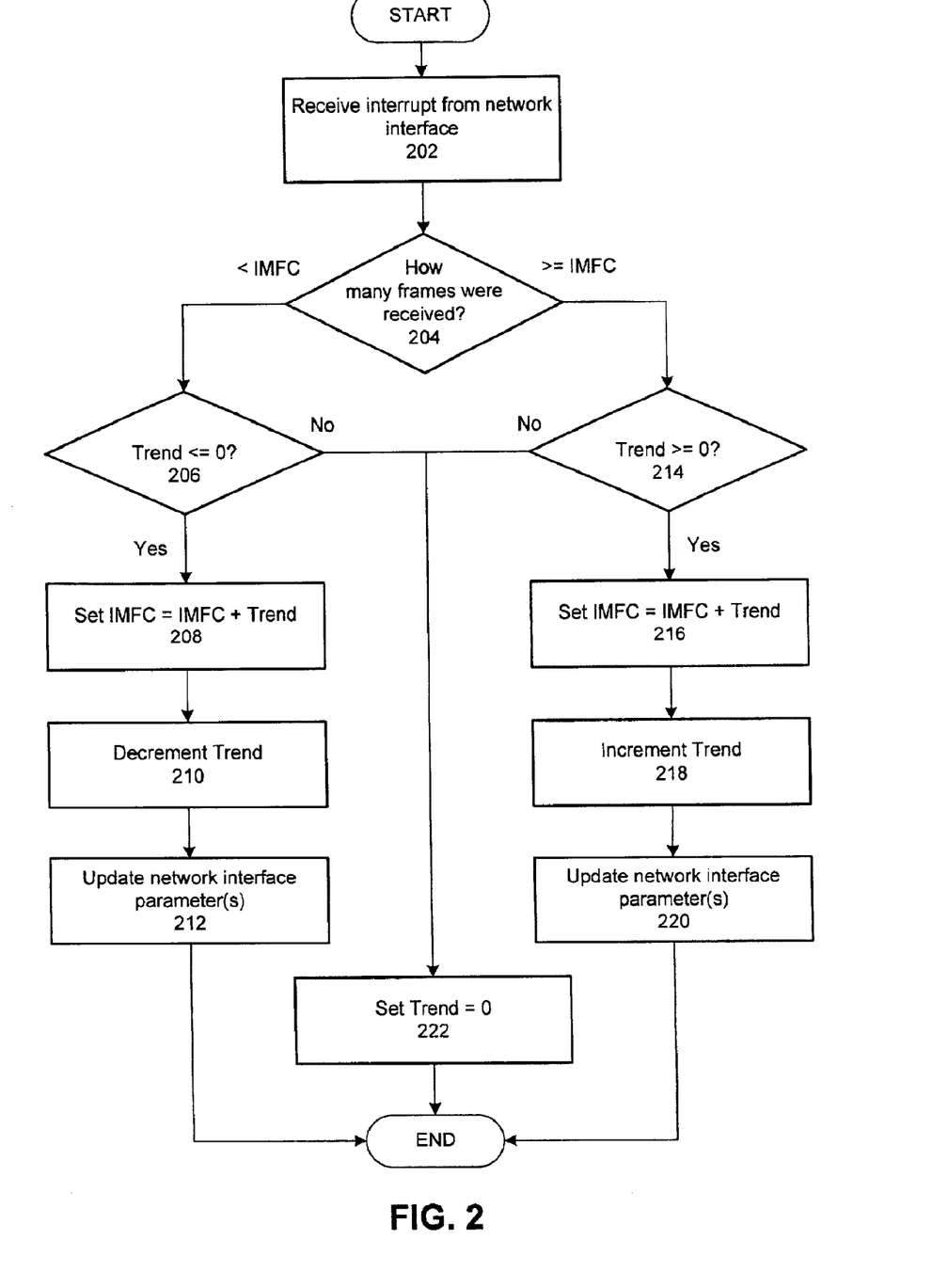
FIG. 2 is a flowchart demonstrating one method of dynamically adjusting interrupt coalescing parameters of a communication interface, according to one embodiment of the invention.

FIG. 2 is a flowchart demonstrating a method of adjusting interrupt coalescing parameters of a communication interface, according to one embodiment of the invention. The illustrated method is primarily applied by an interrupt handling routine executed by a host processor that receives interrupts, from the communication interface, when the communication interface passes one or more frames, packets or other communications to the host.

In state 202, a first interrupt is received from the communication interface, along with one or more frames. The interrupt may have been generated because the interface accumulated a number of frames equivalent to its current IMFC setting, or because a latency timer set to IML expired.

In state 204, the interrupt handler compares the number of received frames, N, to the current IMFC setting. If N≧IMFC, the method advances to state 214; otherwise (i.e., N<IMFC), the method continues at state 206.

In state 206, the number of frames received with the interrupt is less than the maximum that could have been sent. This indicates that the interrupt was issued because a latency timer (e.g., IML) expired. This may indicate that IMFC is set too high for the current flow of communication traffic. Therefore, the interrupt handler determines whether the current trend, T, is less than or equal to 0, which would indicate that at least the previous interrupt also arrived with fewer than IMFC frames. If T>0, the method advances to state 222.

Otherwise, if T≦0, in order to allow IMFC to be decreased, or decreased further, in state 208 IMFC is adjusted by the value of the trend parameter (i.e., IMFC=IMFC+T). Because T is no greater than zero, IMFC will not increase, and may instead decrease.

However, in the illustrated embodiment of the invention, the minimum value that may be assigned to IMFC is determined by the parameter minimum_packets (e.g., one). Thus, if combining IMFC and T would yield a new IMFC value less than the minimum, IMFC is set to the minimum.

In state 210, because N<IMFC, the trend value is decremented (e.g., T=T−1).

In state 212, the interrupt handler updates one or more interrupt coalescing parameters of the communication interface. In particular, the interrupt handler sets the interface's IMFC value to the newly computed IMFC. The method ends after state 212.

In state 214, the number of frames received with the interrupt is at least equal to the maximum that the communication interface could send (i.e., IMFC), which indicates that IMFC may be too low for the current traffic flow. The interrupt handler therefore determines whether T≧0, to compare the present situation is the continuation of a trend of receiving the maximum number of frames. If T<0, the illustrated method continues at state 222; otherwise, the method continues at state 216.

In state 216, IMFC is increased by the trend value (i.e., IMFC=IMFC+T), to allow the communication interface to send more frames with the next interrupt.

In state 218, T is incremented (e.g., T=T+1).

In state 220, the interrupt handler updates one or more interrupt coalescing parameters of the communication interface. In particular, the interrupt handler sets the interface's IMFC value to the newly computed IMFC. The method ends after state 220.

In state 222, the trend, T, is set to zero (i.e., T=0). Illustratively, this is done if the number of frames received by the interrupt handler contradicts the trend. Thus, if the maximum number of frames is received, yet the trend is negative, or if less than the maximum number of frames is received, but the trend is positive, the interrupt handler will set the trend to zero. The method then ends.

TABLE 1 illustrates an application of the method of FIG. 2. "INT" is an ordinal index representing a sequence of interrupts. "Old Trend" and "Old IMFC" represent the values of Trend and IMFC before the current interrupt (e.g., set during the previous interrupt). "Frames" indicates the number of frames received at the host with the current interrupt.

"New Trend" and "New IMFC" represent the new IMFC and Trend values generated by the interrupt handler. As described above, the value of New Trend depends on old trend and the relationship between Frames and Old IMFC. The value of New IMFC depends on Old Trend and Old IMFC. "Total Frames" is a cumulative count of the number of frames received.

TABLE 1

| INT | Old Trend | Old IMFC | Frames | New Trend | New IMFC | Total Frames |
|---|---|---|---|---|---|---|
| 0 | 0 | 1 | 1 | 1 | 1 | 1 |
| 1 | 1 | 1 | 1 | 2 | 2 | 2 |
| 2 | 2 | 2 | 2 | 3 | 4 | 4 |
| 3 | 3 | 4 | 4 | 4 | 7 | 8 |
| 4 | 4 | 7 | 7 | 5 | 11 | 15 |
| 5 | 5 | 11 | 11 | 6 | 16 | 26 |
| 6 | 6 | 16 | 16 | 7 | 22 | 42 |
| 7 | 7 | 22 | 22 | 8 | 24 | 64 |
| 8 | 8 | 24 | 8 | 0 | 24 | 72 |
| 9 | 0 | 24 | 4 | −1 | 24 | 76 |
| 10 | −1 | 24 | 4 | −2 | 23 | 80 |
| 11 | −2 | 23 | 12 | −3 | 21 | 92 |
| 12 | −3 | 21 | 20 | −4 | 18 | 112 |
| 13 | −4 | 18 | 12 | −5 | 14 | 124 |
| 14 | −5 | 14 | 4 | −6 | 9 | 128 |

TABLE 1 illustrates how IMFC and Trend may increase when successive interrupts arrive with fall complements of packets. In this example, maximum_packets is set to 24, which is reached during the processing of interrupt number 7. The Trend value then swings from positive to negative as a series of interrupts is received with packet loads that are less than IMFC. The IMFC parameter then steadily decreases as long as interrupts are received without full packet loads.

The maximum_FLS (Fallback Latency Sensitivity) parameter introduced above may be used in an embodiment of the invention to prevent a "hunting" pattern of adjustments to interrupt coalescing parameters (e.g., IMFC), in which IMFC "hunts" for an appropriate value.

In particular, when IMFC is at its minimum value, such as one, IMFC will be increased by one (e.g., to two) after a single packet or communication is received. This adjustment to IMFC prepares the communication interface to handle an influx of packets (e.g., a bulk data transfer pattern of traffic). However, if a request-response pattern is experienced instead, which may be evidenced by the receipt of only one packet during each successive interrupt, then each packet received while IMFC is at its incremented value (e.g., two) will be delayed, because its associated interrupt will be issued only when the latency timer (e.g., IML) expires. Because only one packet is received during each interrupt, the increase in IMFC causes inefficient operation of the interface.

This is a special case of the situation in which the number of packets received is less than IMFC. Processing of the packet(s) is delayed because an interrupt is not issued until a latency timer expires. In contrast, when IMFC is set to a minimum value of one and a single packet is received, an interrupt is issued right away.

Figure 3A:
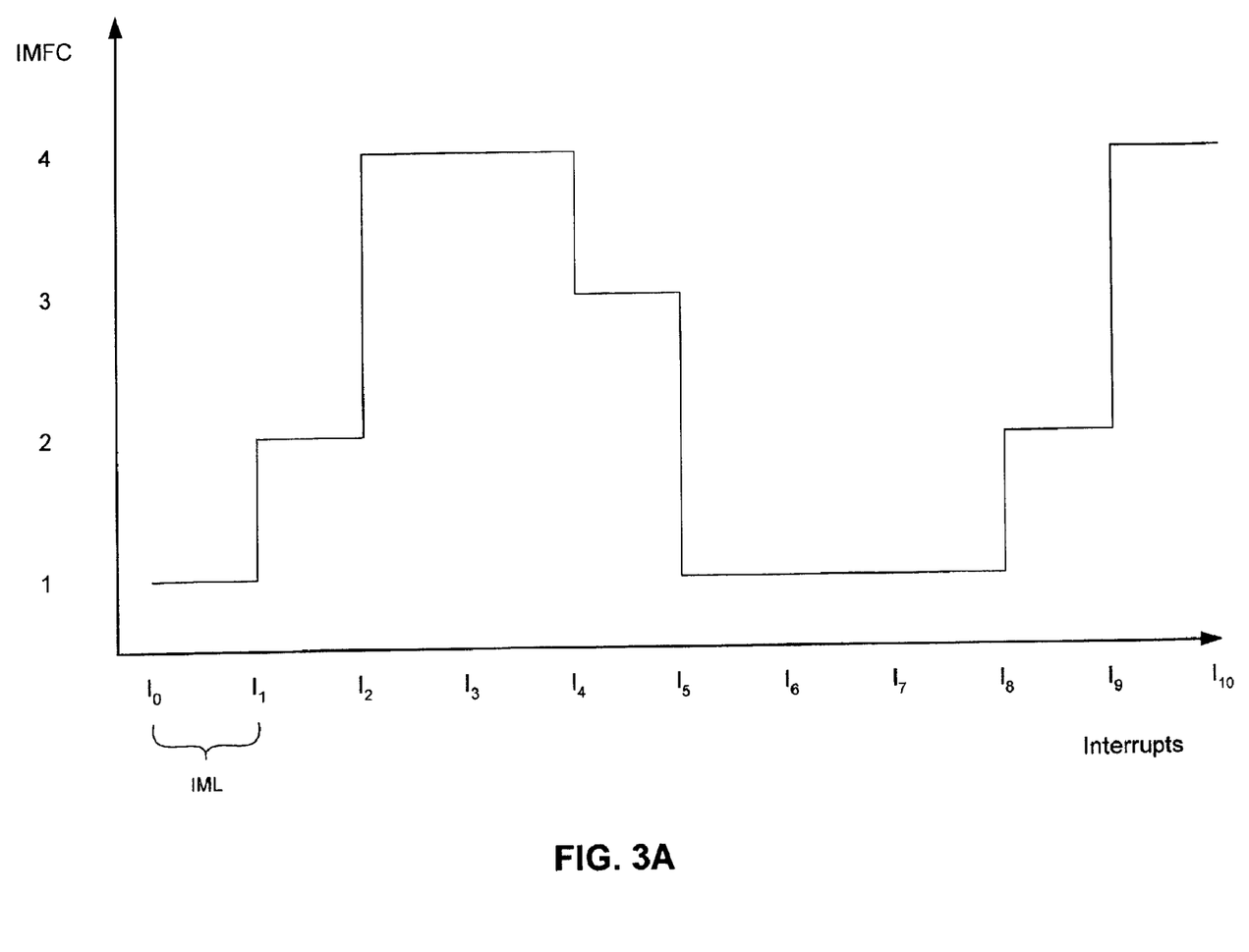
FIG. 3A is a graph demonstrating a "hunting" pattern of interrupt coalescing parameter adjustments that may be observed with one embodiment of the invention.

FIG. 3A is a graph of IMFC adjustments (x-axis) for successive interrupts (y-axis), and exhibits an illustrative hunting pattern spanning several interrupts. TABLE 2 reflects adjustments to IMFC and Trend made during servicing of the interrupts, and the number of packets received with each interrupt.

TABLE 2

| INT | Old Trend | Old IMFC | Frames | New Trend | New IMFC | Total Frames |
|---|---|---|---|---|---|---|
| 0 | 0 | 1 | 1 | 1 | 1 | 1 |
| 1 | 1 | 1 | 1 | 2 | 2 | 2 |
| 2 | 2 | 2 | 1 | 0 | 4 | 3 |
| 3 | 0 | 4 | 1 | −1 | 4 | 4 |
| 4 | −1 | 4 | 1 | −2 | 3 | 5 |
| 5 | −2 | 3 | 1 | −3 | 1 | 6 |
| 6 | −3 | 1 | 1 | 0 | 1 | 7 |
| 7 | 0 | 1 | 1 | 1 | 1 | 8 |
| 8 | 1 | 1 | 1 | 2 | 2 | 9 |
| 9 | 2 | 2 | 1 | 0 | 4 | 10 |
| 10 | 0 | 4 | 1 | −1 | 4 | 11 |

For each interrupt depicted in FIG. 3A, the interrupt handler receives just one packet, which may indicate a request-response communication environment. At interrupt $I_0$, because the single interrupt matches the current IMFC value, Trend is incremented to record that occurrence and allow IMFC to grow, in case more than one packet could be transferred from the communication interface to the host at a time. During interrupt $I_1$, Trend is incremented again because the single received packet matched IMFC, and so the value of IMFC is increased. At interrupt $I_2$, even though Trend is now zeroed—because the number of received packets (i.e., 1) is less than IMFC—IMFC increases again due to the magnitude of Trend. IMFC levels off during $I_3$, and Trend then swings negative. This allows IMFC to fall back to its minimum value during interrupts $I_4$, $I_5$ and $I_6$. The "hunting" pattern then resumes (if the same traffic pattern continues).

In one embodiment of the invention, the maximum_FLS parameter is used to initialize an FLS counter when IMFC is increased from its minimum value. Illustratively, a suitable value for maximum_FLS is three. In this embodiment, the minimum value of IMFC is one, but in other embodiments of the invention, a different minimum value may be employed.

In one alternative embodiment of the invention, activation of the FLS mechanism requires not only an increase in IMFC from its minimum value, but also the receipt of a number of packets equal to IMFC. Thus, in this embodiment, if the number of packets received during the interrupt in which IMFC increases from its minimum value is less than (or greater than) IMFC, the FLS mechanism does not kick in.

After being initialized, the FLS counter decrements by one with each successive interrupt handling, until reaching zero, at which time the FLS mechanism becomes quiescent. Until the FLS counter reaches zero, if an interrupt is issued because the latency timer (e.g., IML) of the communication interface expired, then the Trend value is set to −1 and IMFC is set to 1. Illustratively, the interrupt handler can determine that an interrupt was received because of expiration of the latency timer if the number of packets received with the interrupt is less than IMFC.

Also, when the FLS counter is initialized, IML is set to a minimum value which, in this embodiment, is 4.5 microseconds. Each time the FLS counter is decremented, IML is increased toward its maximum (i.e., maximum_latency), by the value of incremental_latency (if such a parameter is set). If IML is restricted to multiples of 4.5 microseconds in this embodiment, it grows from 4.5 microseconds to 9.0 microseconds to 13.5 microseconds, etc. When the FLS counter reaches zero, IML is reset to its "normal" value which, in this embodiment, is equivalent to maximum_latency. Decreasing the amount of time between interrupts help promote a rapid return of IMFC to minimum_packets if a low rate of packet arrival continues.

Figure 3B:
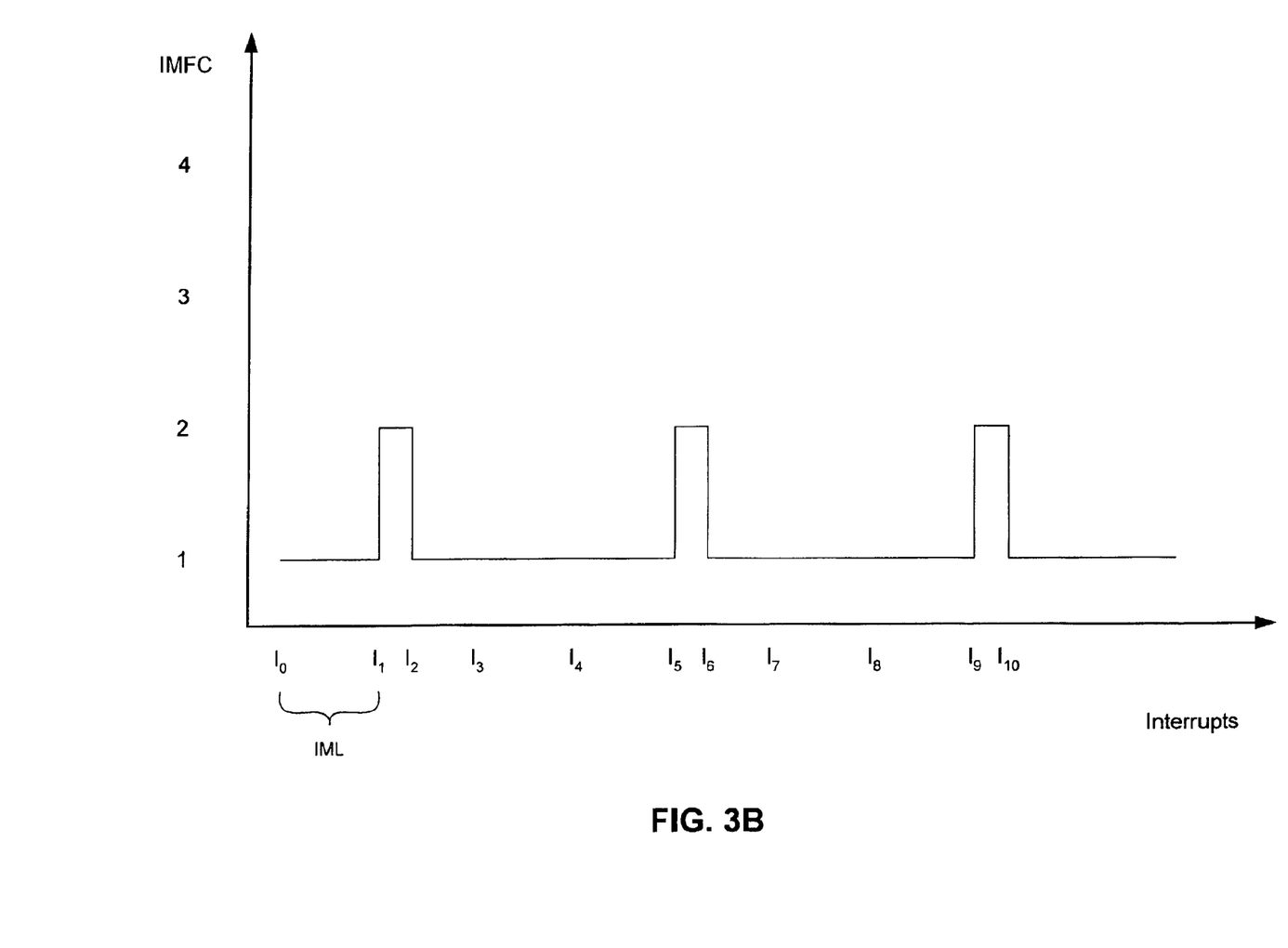
FIG. 3B is a graph demonstrating an attenuated "hunting" pattern of interrupt coalescing parameter adjustments that result from implementation of a fallback latency sensitivity (FLS) mechanism, according to one embodiment of the invention.

FIG. 3B and TABLE 3 reflect the application of an FLS mechanism in an embodiment of the invention, for the same traffic pattern reflected in FIG. 3A and TABLE 2. TABLE 3 includes additional columns showing the values of the FLS counter and IML (in microseconds). In this example, maximum_FLS=3 and, before interrupt number 0, FLS (the FLS counter)=0 and IML is equal to maximum_latency (e.g., 13.5 microseconds). Minimum_latency and incremental_latency are both 4.5 microseconds. Minimum_packets=1.

TABLE 3

| INT | Old Trend | Old IMFC | Frames | New Trend | New IMFC | New IML | New FLS | Total Frames |
| --- | --- | --- | --- | --- | --- | --- | --- | --- |
| 0 | 0 | 1 | 1 | 1 | 1 | 13.5 | 0 | 1 |
| 1 | 1 | 1 | 1 | 2 | 2 | 4.5 | 3 | 2 |
| 2 | 2 | 2 | 1 | −1 | 1 | 9.0 | 2 | 3 |
| 3 | −1 | 1 | 1 | 0 | 1 | 13.5 | 1 | 4 |
| 4 | 0 | 1 | 1 | 1 | 1 | 13.5 | 0 | 5 |
| 5 | 1 | 1 | 1 | 2 | 2 | 4.5 | 3 | 6 |
| 6 | 2 | 2 | 1 | −1 | 1 | 9.0 | 2 | 7 |

In comparison to FIG. 3A, the graph of FIG. 3B shows a much more efficient treatment of request-response traffic, and a greatly attenuated hunting pattern. In particular, because IML is temporarily reduced during application of the FLS mechanism, and because IMFC is rapidly returned to its minimum value, the latency experienced by packets received at the communication interface is substantially reduced.

Figure 4A:
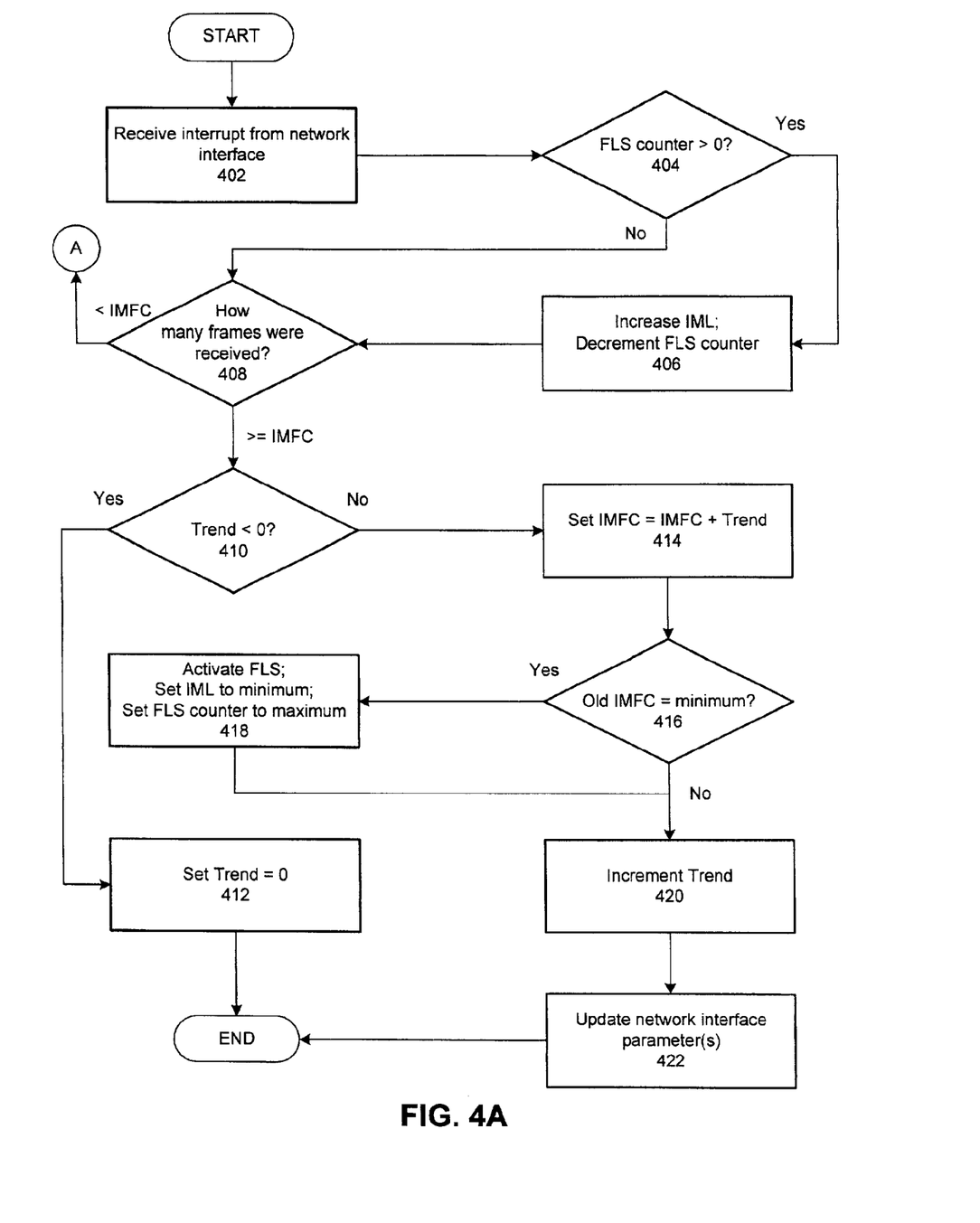
FIGS. 4A–B comprise a flowchart demonstrating a method of dynamically adjusting interrupt coalescing parameters of a communication interface while implementing an FLS mechanism, according to one embodiment of the invention.
Figure 4B:
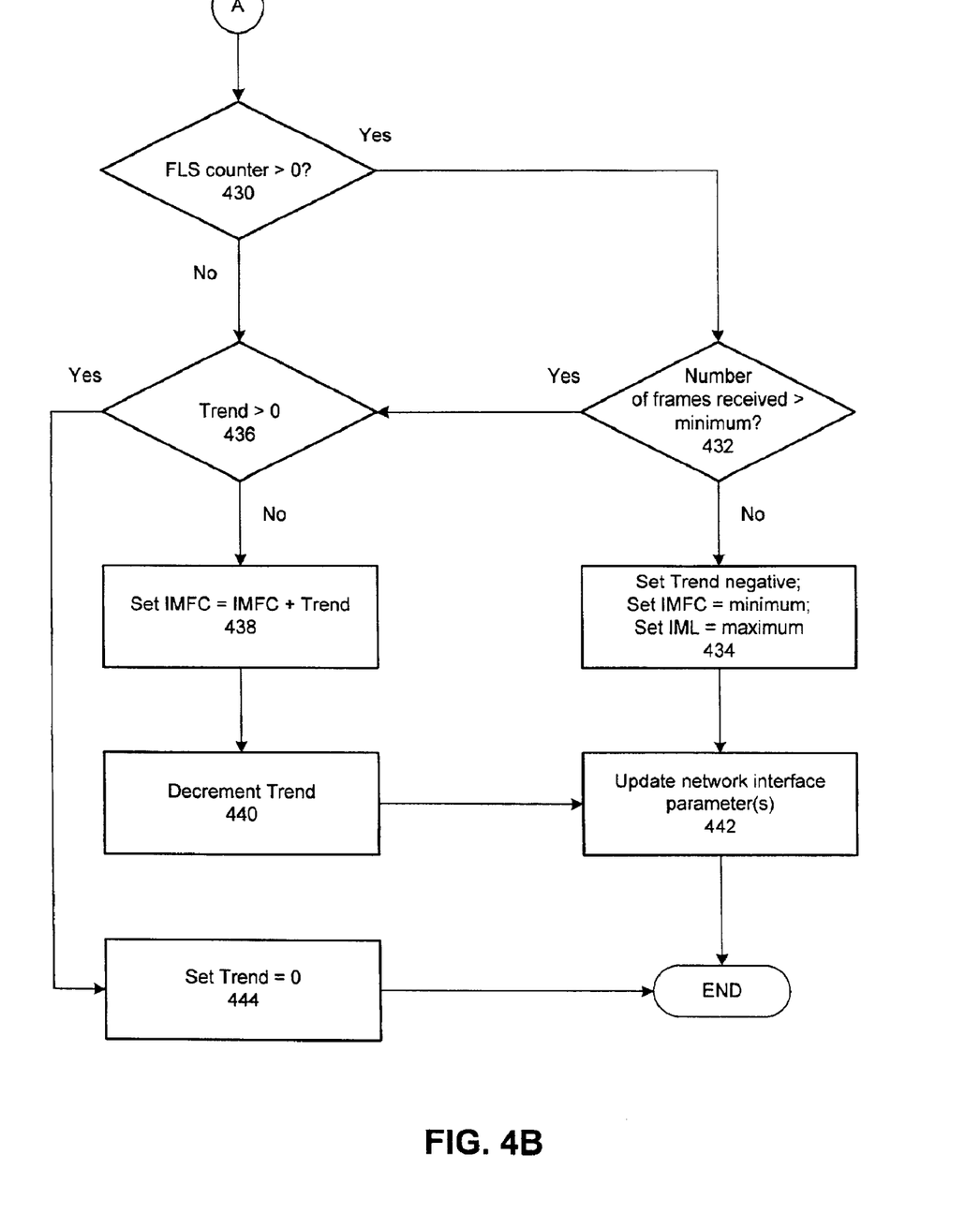

FIG. 4 demonstrates, in greater detail, a method of automatically and dynamically adjusting interrupt coalescing parameters (e.g., IMFC, IML) of a communication interface, according to the dynamic workload of the interface, in one embodiment of the invention.

In state 402, the interrupt handler is called, invoked or woken to handle an interrupt from a network interface or other communication interface. The interrupt was signaled either because the network interface accumulated a number of frames, packets or other communications equal to its current IMFC setting or because a period of time equal to its current IML setting elapsed after receipt of a frame.

In state 404, the interrupt handler examines an FLS counter to determine if it is greater than 0. If it is greater than zero, then the FLS mechanism is active, and the method continues at state 406; otherwise, the method advances to state 408.

In state 406, the interrupt handler increases IML (e.g., by the value of incremental_latency), but not beyond the value of maximum_latency. The interrupt handler also decrements the FLS counter by one, but no lower than zero.

In state 408, the interrupt handler compares the current IMFC setting of the network interface to the number of frames received with the interrupt. If the number of frames is less than the current IMFC, the illustrated method advances to state 430.

Otherwise, in state 410, the current interrupt was issued because the network interface accumulated a number of frames at least equal to IMFC. The interrupt handler examines the current Trend value. If Trend is zero or positive, which indicates that the amount of frames received with the current interrupt (i.e., >=IMFC) matches the recent trend, the method advances to state 414.

If Trend is negative, which indicates that the network interface has not been sending a full complement of frames (i.e., equivalent to IMFC) with recent interrupts, in state 412 Trend is reset to zero and the method ends.

In state 414, a new IMFC value is calculated by adding the current IMFC value and the value of Trend. However, IMFC will not be increased beyond the parameter maximum_packets.

In state 416, the interrupt handler determines whether IMFC has just been increased from minimum_packets (e.g., one). If so, the method continues at state 418; otherwise, it proceeds to state 420. In other embodiments, the interrupt handler may test for other conditions. For example, in one alternative embodiment, the interrupt handler specifically determines whether IMFC has just been increased from one to two.

In state 418, an FLS mechanism or scheme is activated. Therefore, IML is set to a minimum value (e.g., minimum_latency), such as 4.5 microseconds, and an FLS counter is initialized to maximum_FLS (e.g., three).

In state 420, the value of Trend is incremented (e.g., by one).

In state 422, one or more interrupt coalescing parameter values (e.g., the new IMFC and IML values) are written into the network interface to adjust the circumstances under which the interface will issue an interrupt, in an attempt to better match the interrupts to the actual traffic pattern and prevent or suppress an inefficient hunting pattern. The method then ends.

In state 430, the number of frames received with the current interrupt is less than the current IMFC value. The interrupt handler examines the FLS counter to see if the FLS mechanism is still active (e.g., is FLS>0?). If the FLS mechanism is no longer active, the illustrated method advances to state 436.

Otherwise, in state 432, the interrupt handler determines whether more than a minimum number of frames (e.g., one) were received with the current interrupt. If so, the method advances to state 436.

In state 434, the conditions for IMFC fall back have been satisfied. In particular, for this embodiment of the invention, the FLS counter is greater than zero, and the minimum number of frames was just received. Therefore, the interrupt handler sets Trend to a negative value (e.g., −1), resets IMFC to its minimum (e.g., minimum_packets) and sets IML to its maximum (e.g., maximum_latency). The illustrated method then advances to state 442.

In state 436, the interrupt handler determines whether the current Trend is positive. If so, then the current complement of frames (i.e., <IMFC) conflicts with the trend and therefore Trend is reset to zero in state 444 and the method ends.

Otherwise, in state 438, a new IMFC value is computed as the sum of the current IMFC value and Trend. However, IMFC will not be decreased below minimum_packets.

In state 440, the value of Trend is decremented (e.g., by one).

In state 442, the network interface is dynamically updated with one or more new interrupt coalescing parameter values (e.g., IMFC, IML). The method then ends.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of dynamically adjusting one or more communication interface parameters configured to control the signaling of interrupts from a communication interface to a host processor, the method comprising:
   receiving, at a host processor:
      a first interrupt generated by the communication interface in connection with receipt of a first communication from a communication link; and
      a first number of communications from the communication interface, including the first communication;
   determining a workload of the communication interface; and
   dynamically adjusting one or more of the following parameters on the communication interface without reinitializing the communication interface:
      a first parameter configured to indicate a maximum number of communications the communication interface may accumulate before generating an interrupt to the host processor; and
      a second parameter configured to indicate a maximum period of time the communication interface may wait after receiving a first communication before generating an interrupt to the host processor;
   wherein said determining a workload of the communication interface comprises:
      determining said first number;
      comparing said first number with a current value of said first parameter; and
      examining a trend, wherein said trend comprises a value configured to indicate a relationship between:
         the number of communications received with a previous interrupt from the communication interface; and
         a value of said first parameter at the time the previous interrupt was received.

2. The method of claim 1, wherein said determining a workload of the communication interface further comprises:
   setting said trend to zero.

3. The method of claim 1, wherein said determining a workload of the communication interface further comprises:
   modifying said current value of said first parameter by said trend to produce a new value of said first parameter; and
   modifying said trend.

4. The method of claim 3, wherein said dynamically adjusting comprises setting said first parameter to said new value of said first parameter.

5. The method of claim 3, wherein said modifying said current value of said first parameter comprises adding said current value of said first parameter and said trend.

6. The method of claim 3, wherein said modifying said trend comprises incrementing said trend.

7. The method of claim 3, wherein said modifying said trend comprises decrementing said trend.

8. A method of dynamically adjusting one or more communication interface parameters configured to control the signaling of interrupts from a communication interface to a host processor, the method comprising:
   receiving, at a host processor:
      a first interrupt generated by the communication interface in connection with receipt of a first communication from a communication link; and
      a first number of communications from the communication interface, including the first communication;
   determining a workload of the communication interface; and
   dynamically adjusting one or more of the following parameters on the communication interface without reinitializing the communication interface:
      a first parameter configured to indicate a maximum number of communications the communication interface may accumulate before generating an interrupt to the host processor; and
      a second parameter configured to indicate a maximum period of time the communication interface may wait after receiving a first communication before generating an interrupt to the host processor;
   wherein said determining a workload of the communication interface comprises:
      if a fallback counter is between an initial value and a final value:
         increasing a current value of said second parameter to produce a new value for said second parameter; and
         decreasing said fallback counter;
         wherein said fallback counter comprises a number of interrupts;
      determining said first number;
      comparing said first number with a current value of said first parameter; and
      examining a trend, wherein said trend comprises a value configured to indicate a relationship between:
         the number of communications received with a previous interrupt from the communication interface; and
         a value of said first parameter at the time the previous interrupt was received.

9. The method of claim 8, further comprising setting said trend to zero.

10. The method of claim 8, further comprising, if said first number is equal to or greater than said current value of said first parameter:
    modifying said current value of said first parameter by said trend to produce a new value of said first parameter;
    increasing said trend; and
    if said current value of said first parameter is equal to a minimum first parameter value:
       setting said new value of said second parameter to a minimum second parameter value; and
       setting said fallback counter to said initial fallback counter value.

11. The method of claim 10, wherein said dynamically adjusting comprises:

setting said first parameter to said new value of said first parameter.

12. The method of claim 11, wherein said dynamically adjusting further comprises:
setting said second parameter to said new value of said second parameter.

13. The method of claim 8, further comprising, if said first number is less than said current value of said first parameter:
if said fallback counter is between said initial fallback counter value and said final fallback counter value:
setting said trend to zero;
setting said new value of said second parameter to a maximum second parameter value; and
setting a new value of said first parameter to a minimum first parameter value;
modifying said current value of said first parameter by said trend to produce a new value of said first parameter; and
decreasing said trend.

14. The method of claim 13, wherein said dynamically adjusting comprises:
setting said first parameter to said new value of said first parameter.

15. The method of claim 14, wherein said dynamically adjusting further comprises:
setting said second parameter to said new value of said second parameter.

16. The method of claim 1, wherein:
said receiving a first interrupt;
said determining a workload of the communication interface; and
said dynamically adjusting
are performed by an interrupt handler configured to service the first interrupt.

17. A computer readable storage medium storing instructions that, when executed by a computer, cause the computer to perform a method of dynamically adjusting one or more communication interface parameters configured to control the signaling of interrupts from a communication interface to a host processor, the method comprising:
receiving, at a host processor, a first interrupt generated by the communication interface in connection with receipt of a first communication from a communication link;
determining a workload of the communication interface; and
dynamically adjusting one or more of the following parameters on the communication interface without reinitializing the communication interface:
a first parameter configured to indicate a maximum number of communications the communication interface may accumulate before generating an interrupt to the host processor; and
a second parameter configured to indicate a maximum period of time the communication interface may wait after receiving a first communication before generating an interrupt to the host processor;
wherein said determining a workload of the communication interface comprises:
determining said first number;
comparing said first number with a current value of said first parameter; and
examining a trend, wherein said trend comprises a value configured to indicate a relationship between:
the number of communications received with a previous interrupt from the communication interface; and a value of said first parameter at the time the previous interrupt was received.

18. A method of dynamically adjusting interrupt coalescing parameters on a communication interface according to a pattern of communications received at the communication interface, without reinitializing the communication interface, the method comprising:
receiving a first interrupt from the communication interface;
identifying a first number of communications received with the first interrupt;
comparing the first number of communications to a current value of a first parameter of the communication interface, wherein said first parameter comprises a number of communications the communication interface may accumulate before issuing an interrupt;
examining a numerical trend configured to indicate a relationship between:
a previous value of the first parameter at the time of a previous interrupt; and
a previous number of communications received with the previous interrupt;
adjusting said trend based on:
said comparison of said first number of communications to said current value of said first parameter; and
a current value of said trend; and
if said adjusted trend is not equal to a threshold trend:
producing a first new value for said first parameter, based on said current value of said first parameter and said trend; and
dynamically updating said first parameter of the communication interface with said first new value.

19. The method of claim 18, wherein adjusting said trend comprises setting said trend to said threshold trend value.

20. The method of claim 18, wherein adjusting said trend comprises incrementing said trend.

21. The method of claim 18, wherein adjusting said trend comprises decrementing said trend.

22. The method of claim 18, wherein said threshold trend is zero.

23. The method of claim 18, wherein said producing a first new value for said first parameter comprises:
adding said current value of said first parameter and said current value of said trend.

24. The method of claim 18, wherein said dynamically updating said first parameter comprises:
writing said first new value of said first parameter to the communication interface.

25. The method of claim 18, further comprising:
examining a fallback counter comprising a number of interrupts during the processing of which said first new value of said first parameter may be automatically set to a first minimum value;
if said fallback counter is not equal to a final fallback counter value:
adjusting said fallback counter toward said final fallback counter value; and
setting a second new value for a second parameter of the communication interface, wherein said second parameter is configured to indicate a period of time the communication interface may wait, after receipt of a communication, before issuing an interrupt; and
if said adjusted trend is not equal to said threshold trend, dynamically updating said second parameter of the communication interface with said second new value.

26. The method of claim 25, wherein said first minimum value is 1.

27. The method of claim 25, wherein said final fallback counter value is 0.

28. The method of claim 25, wherein said adjusting said fallback counter comprises decrementing said fallback counter.

29. The method of claim 25, further comprising:
if said first number of communications is not less than said current value of said first parameter, and said trend is not negative:
if said current value of said first parameter is equal to said first minimum value;
setting said second new value of said second parameter to a second minimum value; and
setting said fallback counter to an initial fallback counter value.

30. The method of claim 29, wherein said second minimum value equals a value by which said second parameter is incrementable.

31. The method of claim 29, wherein said second minimum value is 4.5 microseconds.

32. The method of claim 29, wherein said initial fallback counter is approximately 3.

33. The method of claim 25, further comprising:
if (said first number of communications is less than said current value of said first parameter) and (said fallback counter is not equal to said final fallback counter value):
if said first number of communications equals a minimum number of communications:
reversing said trend;
setting said first new value of said first parameter to said first minimum value; and
setting said second new value of said second parameter to a maximum value.

34. The method of claim 33, wherein said reversing said trend comprises setting said trend to a negative value.

35. A computer readable storage medium storing instructions that, when executed by a computer, cause the computer to perform a method of dynamically adjusting interrupt coalescing parameters on a communication interface according to a pattern of communications received at the communication interface, without reinitializing the communication interface, the method comprising:
receiving a first interrupt from the communication interface;
identifying a first number of communications received with the first interrupt;
comparing the first number of communications to a current value of a first parameter of the communication interface, wherein said first parameter comprises a number of communications the communication interface may accumulate before issuing an interrupt;
examining a numerical trend configured to indicate a relationship between:
a previous value of the first parameter at the time of a previous interrupt; and
a previous number of communications received with the previous interrupt;
adjusting said trend based on:
said comparison of said first number of communications to said current value of said first parameter; and
a current value of said trend; and
if said adjusted trend is not equal to a threshold trend:
producing a first new value for said first parameter, based on said current value of said first parameter and said trend; and
dynamically updating said first parameter of the communication interface with said first new value.

36. A method of dynamically adjusting a network interface parameter for coalescing interrupts, the method comprising:
receiving a first interrupt from a network interface;
determining a number of frames, F, received in conjunction with said first interrupt;
comparing said number of frames to a dynamic threshold, D;
identifying a trend, T, comprising an integer representing a relationship between a number of frames received in conjunction with one or more interrupts previous to the first interrupt and the value of said dynamic threshold at the times of said one or more previous interrupts;

--- if F = D;
    if T < 0, setting T = 0; and
    if T >= 0:
        setting D = D + T;
        incrementing T; and
        dynamically updating one or more parameters, on the network interface, that affect when the network interface may issue an interrupt; and
if F < D:
    if T > 0, setting T = 0; and
    if T <= 0:
        setting D = D + T;
        decrementing T; and
        dynamically updating one or more parameters, on the network interface, that affect when the network interface may issue an interrupt.

---

37. The method of claim 36, wherein said one or more parameters comprise:
a first parameter configured to indicate a number of frames the network interface may accumulate before issuing an interrupt.

38. The method of claim 37, wherein said updating one or more parameters comprises setting said first parameter to D.

39. The method of claim 36, wherein said one or more parameters comprise:
a second parameter configured to indicate a period of time the network interface may wait, after receipt of a first frame, before issuing an interrupt.

40. A computer readable storage medium storing instructions that, when executed by a computer, cause the computer to perform a method of dynamically adjusting a network interface parameter for coalescing interrupts, the method comprising:
receiving a first interrupt from a network interface;
determining a number of frames, F, received in conjunction with said first interrupt;
comparing said number of frames to a dynamic threshold, D;
identifying a trend, T, comprising an integer representing a relationship between a number of frames received in conjunction with one or more interrupts previous to the first interrupt and the value of said dynamic threshold at the times of said one or more previous interrupts;

--- if F = D:
    if T < 0, setting T = 0; and

-continued

```
if T >= 0:
    setting D = D + T;
    incrementing T; and
    dynamically updating one or more parameters, on the
        network interface, that affect when the network interface may issue
        an interrupt; and
if F < D:
    if T > 0, setting T = 0; and
    if T <= 0:
        setting D = D + T;
        decrementing T; and
        dynamically updating one or more parameters, on the
            network interface, that affect when the network interface may issue
            an interrupt.
```

41. A method of dynamically adjusting one or more network interface parameters for coalescing interrupts, the method comprising:
  receiving a first interrupt from a network interface;
  if a counter>0:
    decrementing said counter; and
    increasing a latency, L;
  determining a number of network frames, F, received in conjunction with said first interrupt;
  comparing said number of network frames to a dynamic threshold, D;
  determining a trend, T, comprising an integer representing a relationship between a number of frames received in conjunction with one or more interrupts previous to the first interrupt and the value of said dynamic threshold at the times of said one or more previous interrupts;

```
if F = D:
    if T < 0, setting T = 0; and
    if T >= 0:
        if D = a minimum dynamic threshold:
            setting said counter to an initial value; and
            setting L = a minimum latency;
        setting D = D + T;
        incrementing T; and
        updating one or more parameters, on the network interface,
            that affect when the network interface may issue an interrupt; and
if F < D:
    if (said counter > 0) & (F = a minimum number of frames):
        setting D = said minimum dynamic threshold;
        setting L to a maximum latency; and
        setting T = a negative value;
    if (said counter <= 0) & (T <= 0), setting T = 0; and
    if [(said counter <= 0) & (T > 0)] OR [(said counter > 0) & (F >
        said minimum number of frames)]:
        setting D = D + T;
        decrementing T; and
        updating one or more parameters, on the network interface,
            that affect when the network interface may issue an interrupt.
```

42. The method of claim 41, wherein said one or more parameters comprise:
  a first parameter configured to indicate a number of frames the network interface may accumulate before issuing an interrupt.

43. The method of claim 42, wherein said updating one or more parameters comprises setting said first parameter to D.

44. The method of claim 41, wherein said one or more parameters comprise:
  a second parameter configured to indicate a period of time the network interface may wait, after receipt of a first frame, before issuing an interrupt.

45. The method of claim 44, wherein said updating one or more parameters comprises setting said second parameter to L.

46. A computer readable storage medium storing instructions that, when executed by a computer, cause the computer to perform a method of dynamically adjusting one or more network interface parameters for coalescing interrupts, the method comprising:
  receiving a first interrupt from a network interface;
  if a counter>0:
    decrementing said counter; and
    increasing a latency, L;
  determining a number of network frames, F, received in conjunction with said first interrupt;
  comparing said number of network frames to a dynamic threshold, D;
  determining a trend, T, comprising an integer representing a relationship between a number of frames received in conjunction with one or more interrupts previous to the first interrupt and the value of said dynamic threshold at the times of said one or more previous interrupts;

```
if F = D:
    if T < 0, setting T = 0; and
    if T >= 0:
        if D = a minimum dynamic threshold:
            setting said counter to an initial value; and
            setting L = a minimum latency;
        setting D = D + T;
        incrementing T; and
        updating one or more parameters, on the network interface,
            that affect when the network interface may issue an interrupt; and
if F < D:
    if (said counter > 0) & (F = a minimum number of frames):
        setting D = said minimum dynamic threshold;
        setting L to a maximum latency; and
        setting T = a negative value;
    if (said counter <= 0) & (T <= 0), setting T = 0; and
    if [(said counter <= 0) & (T > 0)] OR [(said counter > 0) & (F >
        said minimum number of frames)]:
        setting D = D + T;
        decrementing T; and
        updating one or more parameters, on the network interface,
            that affect when the network interface may issue an interrupt.
```

47. An apparatus for dynamically adjusting parameters of a communication interface configured to control an interrupt coalescing behavior of the communication interface, the apparatus comprising:
  a processor;
  an interrupt handler routine executable by the processor in response to an interrupt from a communication interface;
  a first value corresponding to a first parameter of the communication interface, wherein said first parameter comprises a number of communications the communication interface may accumulate before signaling an interrupt to the processor;
  a second value corresponding to a second parameter of the communication interface, wherein said second parameter indicates a period of time the communication interface may wait before signaling an interrupt to the processor; and
  a trend value configured to indicate a correlation between a number of communications previously received from the communication interface and said first value when the number of communications was received;
  wherein the interrupt handler routine is configured to dynamically adjust one or more of said first value and said second value, based on a pattern of communications received at the processor from the communication interface.

48. The apparatus of claim 47, wherein said trend value is configured to become positive when a plurality of sequential interrupts received at the processor from the communication interface are received with numbers of communications at least equivalent to values of said first value at the times said sequential interrupts are received.

49. The apparatus of claim 48, wherein said trend value is configured to become negative when a plurality of sequential interrupts received at the processor from the communication interface are received with numbers of communications less than values of said first value at the times said sequential interrupts are received.

50. The apparatus of claim 49, wherein said trend value is configured to be reset to a threshold trend value when one of:

said trend value is positive and a first interrupt is received from the communication interface with a first number of communications less than said first value; and said trend value is negative and a second interrupt is received from the communication interface with a second number of communications greater than or equal to said first value.

51. The apparatus of claim 47, wherein said first value is configured to increase after said trend value increases and decrease after said trend value decreases.

* * * * *